US 8,302,717 B2
Nov. 6, 2012

(12) United States Patent
Mizuta (10) Patent No.: US 8,302,717 B2
(45) Date of Patent: Nov. 6, 2012

(54) UTILITY VEHICLE (75) Inventor: Fumio Mizuta, Akashi (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 423 days.

(21) Appl. No.: 12/615,145

(22) Filed: Nov. 9, 2009

(65) Prior Publication Data

US 2011/0108343 A1 May 12, 2011

(51) Int. Cl.
*B62D 25/10* (2006.01)
(52) U.S. Cl. .................................. 180/69.2; 180/69.21
(58) Field of Classification Search ............... 180/89.17, 180/69.2, 69.21, 69.24, 89.18, 847; 296/198, 296/193.09, 201, 193.11
See application file for complete search history.

(56) References Cited

U.S. PATENT DOCUMENTS

| | | | | |
|---|---|---|---|---|
| 2,606,625 | A * | 8/1952 | Paton | 180/69.21 |
| 6,793,275 | B1 * | 9/2004 | Chernoff et al. | 296/193.11 |
| 6,846,038 | B1 * | 1/2005 | White et al. | 296/193.11 |
| 7,240,753 | B2 * | 7/2007 | Ellerman | 180/69.2 |
| 7,677,343 | B2 * | 3/2010 | Kitai et al. | 180/89.17 |
| 7,984,944 | B2 * | 7/2011 | Mildner et al. | 296/198 |
| 2005/0088015 | A1 * | 4/2005 | Kishikawa et al. | 296/193.09 |
| 2007/0262615 | A1 * | 11/2007 | Koizumi et al. | 296/201 |
| 2008/0217961 | A1 * | 9/2008 | Lustiger et al. | 296/193.09 |
| 2009/0284046 | A1 * | 11/2009 | Mildner et al. | 296/198 |
| 2010/0277942 | A1 * | 11/2010 | Nakagawa | 362/549 |

FOREIGN PATENT DOCUMENTS

JP 2001-191958 7/2001

* cited by examiner

*Primary Examiner* — Hau Phan
(74) *Attorney, Agent, or Firm* — Alleman Hall McCoy Russell & Tuttle LLP (57) ABSTRACT

A utility vehicle includes a hood which is flexible and is configured to cover a space between a pair of right and left front wheels from above; a pair of head lamp devices which are mounted to the hood on the space side; and a support member provided to extend between the pair of head lamp devices; wherein the support member is configured to support the pair of head lamp devices and the hood.

10 Claims, 6 Drawing Sheets

UTILITY VEHICLE

TECHNICAL FIELD

The present invention relates to a utility vehicle which is suitable for driving off-road.

BACKGROUND ART

A utility vehicle for driving off-road is typically four-wheel drive. The utility vehicle is provided with a hood at a front portion of a vehicle body, seats in the vicinity of a center of the vehicle body thereof, and a cargo bed at a rear portion of the vehicle body. An engine unit is mounted below the seats and not below the hood. Since a user opens the hood less frequently, the hood is mounted to the vehicle body such that the hood is substantially fixed to the vehicle body.

In the utility vehicle, the hood may be formed of resin to reduce weight of the vehicle body, for example. However, the resin-made hood is flexible. Therefore, if a large-weight component is mounted to the resin-made hood, the hood may be elastically deformed and cannot maintain a designed shape. Since the elastically deformed hood is incompatible in dimension and shape with members of the vehicle body to which the hood is mounted, when mounting the hood to the vehicle body, the external appearance of the utility vehicle would be degraded.

SUMMARY OF THE INVENTION

A utility vehicle of the present invention comprises a hood which is flexible and is configured to cover a space between a pair of right and left front wheels from above; a pair of head lamp devices which are mounted to the hood on the space side; and a support member provided to extend between the pair of head lamp devices; wherein the support member is configured to support the pair of head lamp devices and the hood.

In the utility vehicle in which the pair of head lamp devices, which are relatively heavy components, are mounted to the flexible hood on the space side, elastic deformation of the hood caused by the weight of the head lamp devices is inhibited because the support member provided to extend between the pair of head lamp devices supports the head lamp devices and the hood. Therefore, the shape of the hood is maintained as designed. This makes it possible to avoid the flexible hood being incompatible with members of the vehicle body to which the hood is mounted and hence to improve an external appearance of the utility vehicle.

The above and further objects and features of the invention will more fully be apparent from the following detailed description with reference to the accompanying drawings.

DETAILED DESCRIPTION OF THE PREFERRED EMBODIMENTS

Hereinafter, an embodiment of the present invention will be described with reference to the drawings. As used herein, the direction is referenced from the perspective of a driver (not shown) seated in a utility vehicle.

Figure 1:
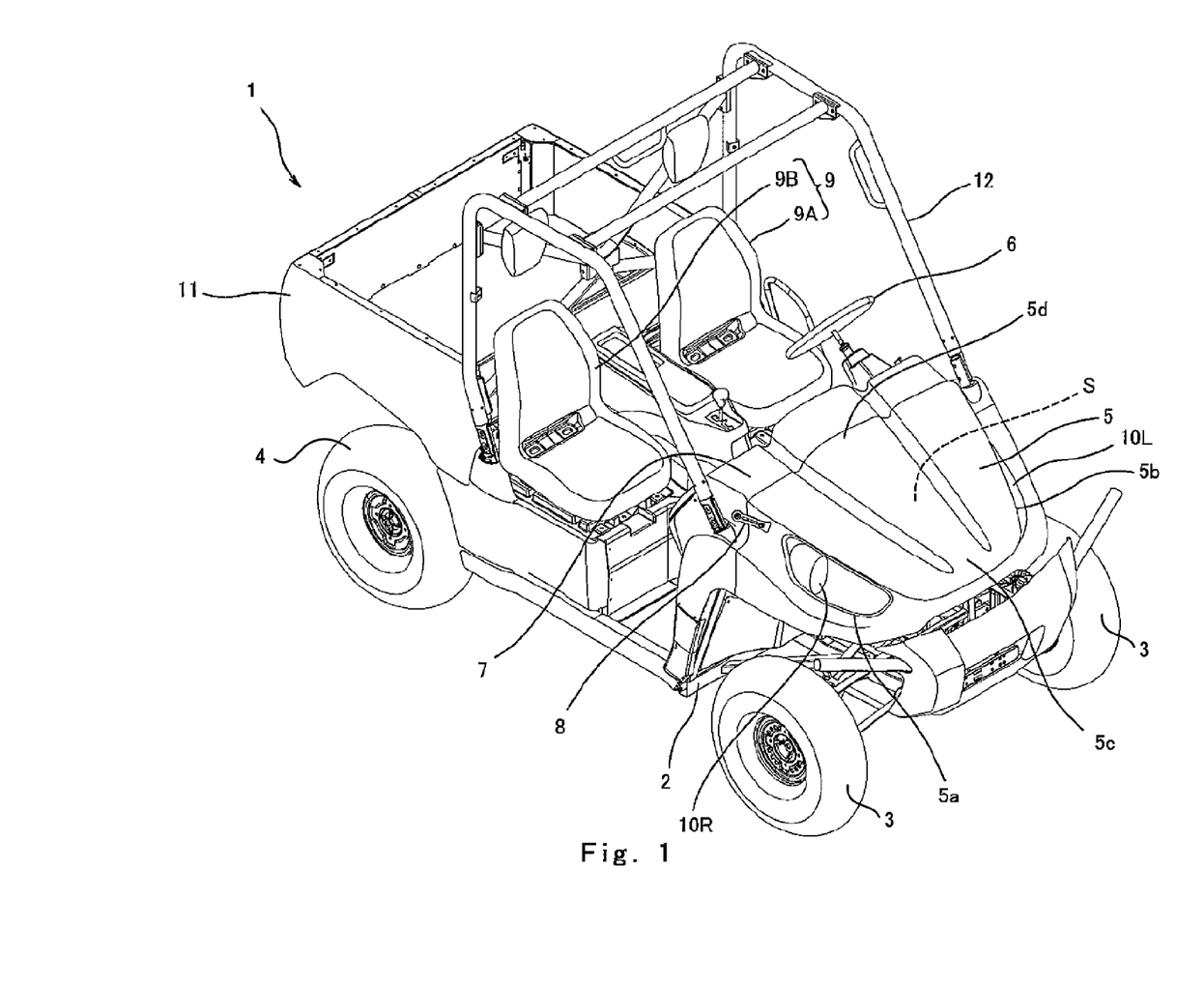
FIG. 1 is a perspective view of a utility vehicle according to an embodiment of the present invention.

FIG. 1 is a perspective view of a utility vehicle 1 according to an embodiment of the present invention. The utility vehicle 1 includes a pair of right and left front wheels 3 at a front portion of a vehicle body frame 2 and a pair of right and left rear wheels 4 at a rear portion of the vehicle body frame 2. A space S between the right and left front wheels 3 is covered with a flexible hood 5 which is made of resin. The hood 5 is provided with a pair of openings 5a and 5b at right and left sides, respectively. Each of the openings 5a and 5b has a length in a forward and rearward direction which is more than half of the length of the hood 5 in the forward and rearward direction, as viewed from a right side of the hood 5, for example. A pair of head lamp devices 10R and 10L which are elongated in the forward and rearward direction are disposed in the openings 5a and 5b, respectively.

A rear end portion 5d of the hood 5 has a larger width in the rightward and leftward direction of the vehicle body than a front end portion 5c of the hood 5. The hood 5 is pivotable around the front end portion 5c thereof to open and close. A cover 7 is provided in front of the seats 9 described later so as to cover an instrument panel 13 (see FIG. 2) on which a handle 6 or gauges are arranged. The rear end portion 5d of the hood 5 in a closed position is joined to a front portion 7b (see FIG. 2) of the cover 7 from above. The hood 5 in the closed position is retained by stopper mechanisms 8 such that its attitude is maintained. In the illustrated example, the stopper mechanism 8 is configured such that a hole of a rubber band fixed to the cover 7 is engageable with a protrusion provided on the hood 5. This is exemplary and any other stopper mechanisms may be employed so long as they are capable of positioning and retaining the hood 5.

A pair of right and left seats 9 (driver seat 9A and passenger seat 9B) are provided behind the hood 5 to be located in the vicinity of the center of the vehicle body in the forward and rearward direction. A cargo bed 11 is provided behind the seats 9. The cargo bed 11 extends rearward from a location which is in close proximity to the rear portion of the seats 9 through a region above the rear wheels 4. A cabin frame 12 surrounding a seat space in which the seats 9 are arranged extends from both end portions of the cover 7 to a location behind the seats 9. The rear end of the hood 5 is positioned in front of the front end of the cabin frame 12. Therefore, the hood 5 is openable and closable so as not to interfere with the cabin frame 12.

The cabin frame 12 is formed by a metal-made cylindrical pipe. The cabin frame 12 surrounds the seat space and is open forward and rearward, rightward and leftward, and upward. The cabin frame 12 serves to protect the driver and the passenger and is used as a mounting member by which a roof or a hood for blocking rain or sunshine is mounted. In a space below the seats 9, an engine unit (not shown) is mounted to drive the front wheels 3 and 4.

Figure 2:
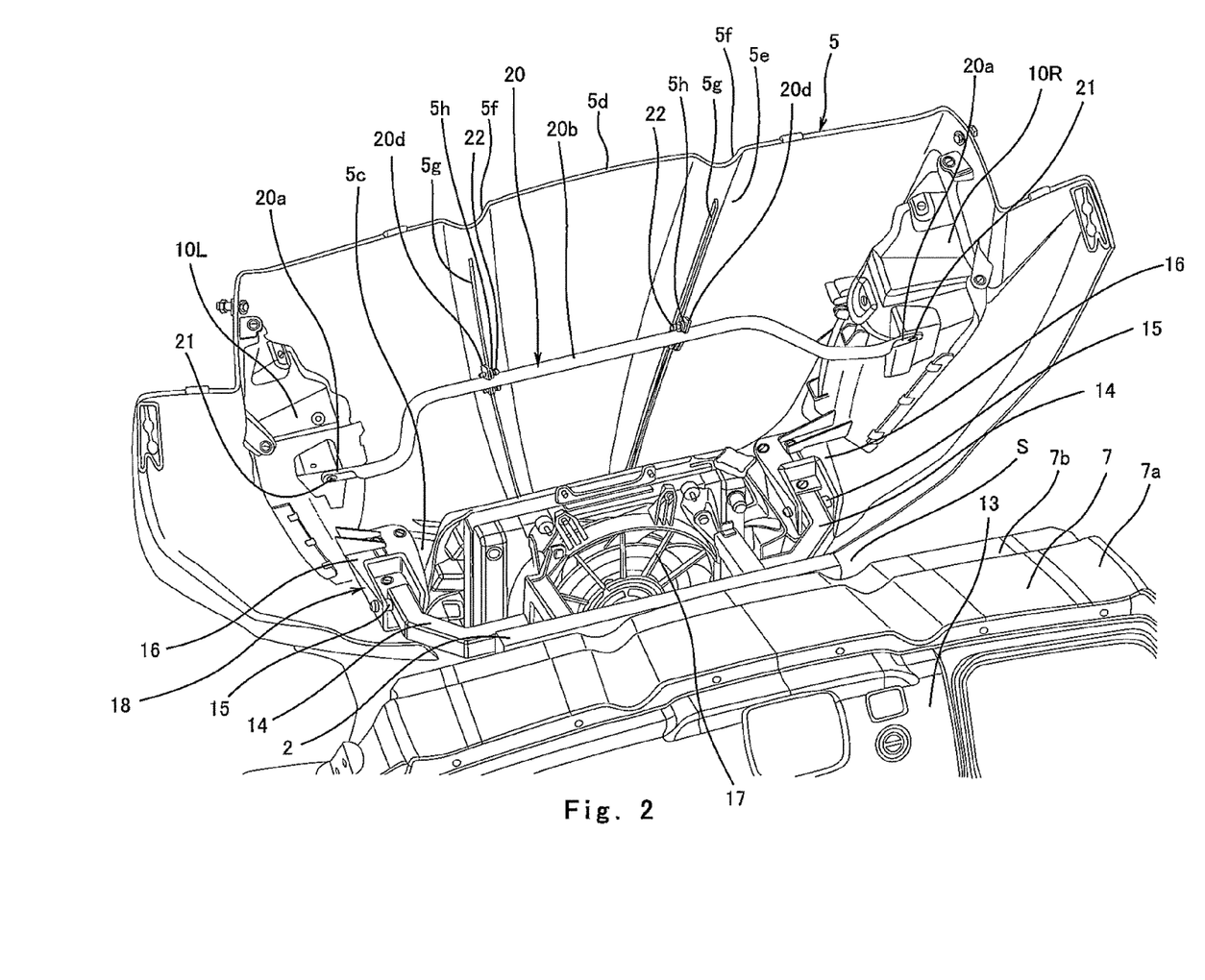
FIG. 2 is a perspective view of a hood in an open position from the perspective of a driver seat.

FIG. 2 is a perspective view of the hood 5 in an open position from the perspective of the driver seat 9A. As shown in FIG. 2, the hood 5 is coupled at the front end portion 5c to the vehicle body frame 2 by hinges 18. In the space S covered with the hood 5, the engine unit is not provided but a radiator 17 and a suspension unit (not shown) are mounted. A pair of stays 14 extending at the right and left sides of the radiator 17 are coupled to the vehicle body frame 2. A rotational shaft 15 having an axis extending in the rightward and leftward direction (vehicle width direction) is provided at the front end portion of each stay 14. A metal-made connecting member 16 is fastened to the front end portion 5c of the hood 5 and is rotatably coupled to the rotational shaft 15. That is, the hinge 18 is constituted by the rotational shaft 15 and the connecting member 16.

The head lamp devices 10R and 10L are mounted to the openings 5a and 5b (see FIG. 1) of the hood 5, respectively, from the direction of the space S. The right and left head lamp devices 10R and 10L are symmetric in the rightward and leftward direction and basically have the same structure. A support member 20 which is made of a stiff metal is provided to extend between the right and left head lamp devices 10R and 10L. To be specific, the support member 20 is a support bar which is formed of a metal pipe. The support bar 20 extends in the rightward and leftward direction along a surface 5e (hereinafter referred to as an inner surface 5e) of the hood 5 which is located on the space S side.

The support bar 20 is curved at required locations so as to substantially conform in shape to the inner surface 5e of the hood 5. Right and left plate-shaped end portions 20a of the support bar 20 are fastened to the head lamp devices 10R and 10L, respectively. An intermediate portion 20b between the right and left end portions 20a of the support bar 20 is fastened to the inner surface 5e of the hood 5. In this manner, the right and left head lamp devices 10R and 10L and the hood 5 are supported by the support bar 20.

The cover 7 covering the instrument panel 13 positioned in front of the driver seat 9A has a stepped upper surface. The cover 7 has the rear portion 7a corresponding to an upper portion of the stepped upper surface and a front portion 7b corresponding to a lower portion of the stepped upper surface. With the hood 5 being in a closed position, the rear end portion 5d of the hood 5 covers the front portion 7b of the cover 7. Therefore, the hood 5 in the closed position and the rear portion 7a of the cover 7 are coplanar with each other.

Figure 3:
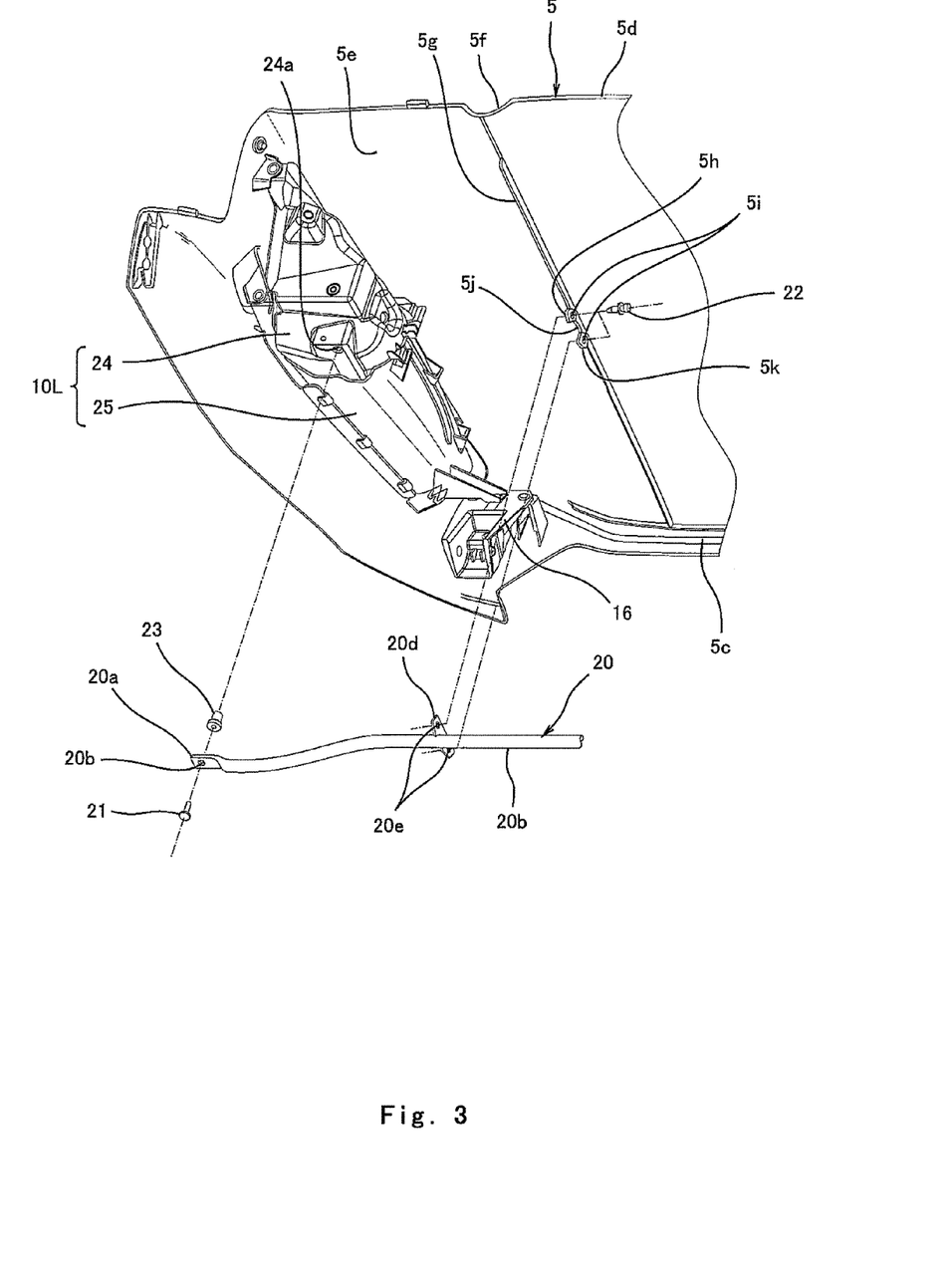
FIG. 3 is an exploded perspective view of a part of the hood in a state before a support bar is attached to the hood.

FIG. 3 is an exploded perspective view of a part of the hood 5 in a state before the support bar 20 is attached to the hood 5. As shown in FIG. 3, the hood 5 is provided with a recess 5f which is recessed in a circular-arc shape toward the space S (see FIG. 2) and extends in the forward and rearward direction. A plate-shaped protruding portion 5g is provided at a ridge portion of the recess 5f at the inner surface 5e side such that the protruding portion 5g protrudes toward the space S (see FIG. 2) and extends in the forward and rearward direction. A pair of mounting plate members 5h (fastened members) are provided in required locations of the protruding portions 5g such that they are spaced apart from each other with a gap 5j. The gap 5j is sized to allow the support bar 20 to be fitted therein. Each mounting plate member 5h has a mounting hole 5i having an axis extending in the rightward and leftward direction.

The support bar 20 is provided with a mounting plate portion 20d (fastened portion) which is joined to the mounting plate portion 5h of the hood 5 in a state where the intermediate portion 20b is fitted in the gap 5j. The mounting plate portion 20d has mounting holes 20e conforming to the mounting holes 5i of the mounting plate portion 5h in a state where the mounting plate portion 20d is joined to the mounting plate portion 5h of the hood 5. Rivets 22 (fastener members) are inserted into the mounting holes 5i and 20e conforming to each other in the state where the mounting plate portion 5h of the hood 5 is joined to the mounting plate portion 20d of the support 20, fastening the intermediate portion 20b of the support bar 20 to the hood 5.

The head lamp device 10L includes a light-emitting unit 24 (light emitting unit) and a reflector unit 25 (non-light-emitting unit). A casing accommodating the light emitting unit 24 and the reflector unit 25 is made of resin. The light emitting unit 24 and the reflector unit 25 are locked and integrally coupled, forming the head lamp device 10L. The light emitting unit 24 is larger in weight than the reflector unit 25, because the light emitting unit 24 has a lamp which is a light-emitting source. The light emitting unit 24 is positioned at the rear position of the head lamp device 10L. Therefore, the center of gravity of the head lamp device 10L is located behind the center of the hood 5 in the forward and rearward direction. A mounting hole 24a is provided at the lower surface of the light emitting unit 24 with the hood 5 being in the closed position. Head lamp device 10R may have a similar configuration.

The end portion 20a of the support bar 20 has a plate shape. A mounting hole 20b is provided at the end portion 20a. A nut 23 is inserted into the mounting hole 24a of the light emitting unit 24 and a bolt 21 is threaded into the mounting holes 20b and 24a conforming to each other in the state where the end portion 20a of the support bar 20 is joined to the lower surface of the light emitting unit 24, fastening the end portion 20a of the support bar 20 to the light emitting unit 24 of the head lamp device 10L. In this manner, the support bar 20 is fastened to the light emitting unit 24 within which the center of gravity of the head lamp device 10L is located, to stably support the head lamp device 10L.

Figure 4:
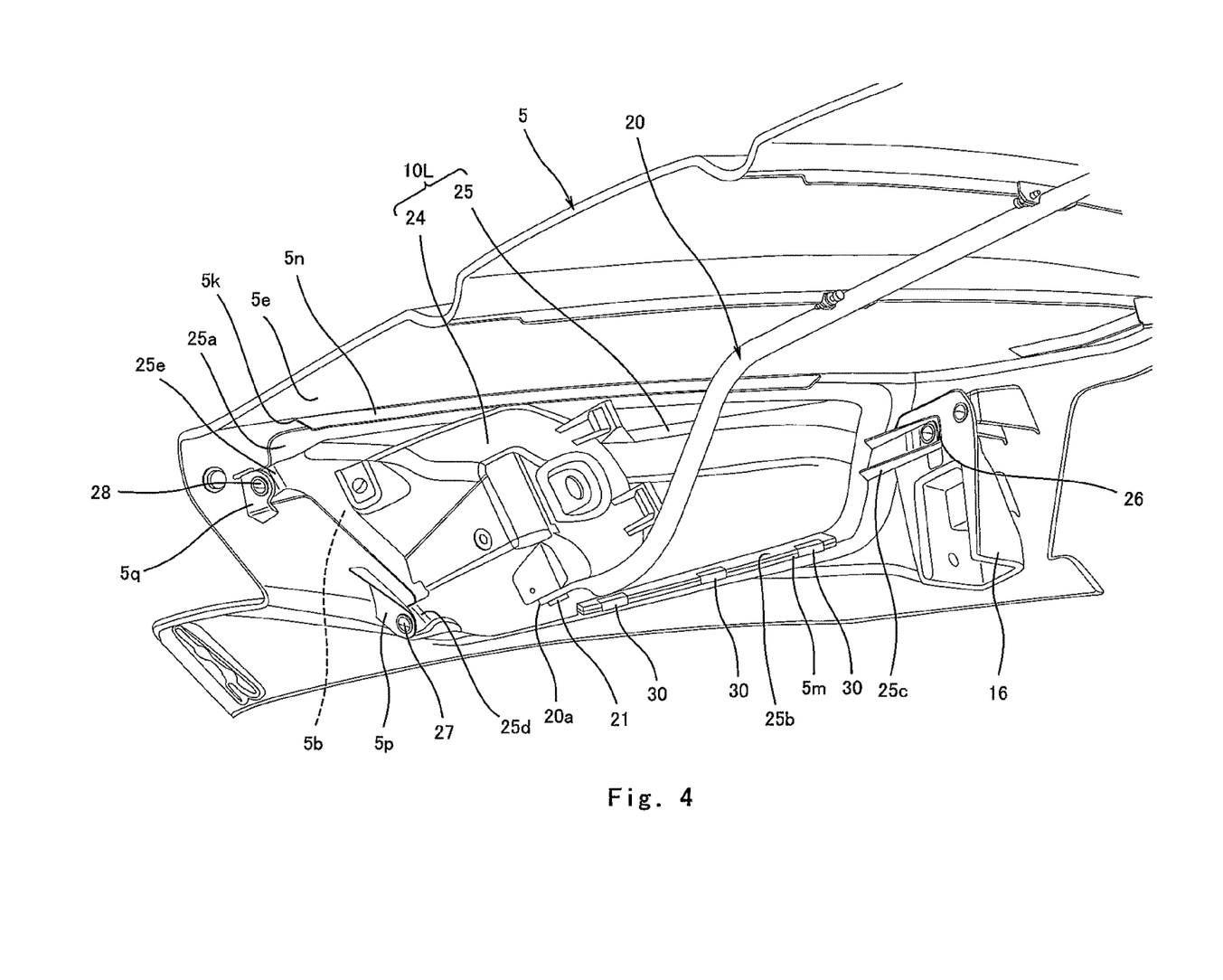
FIG. 4 is a perspective view of a head lamp device mounted to the hood.
Figure 5:
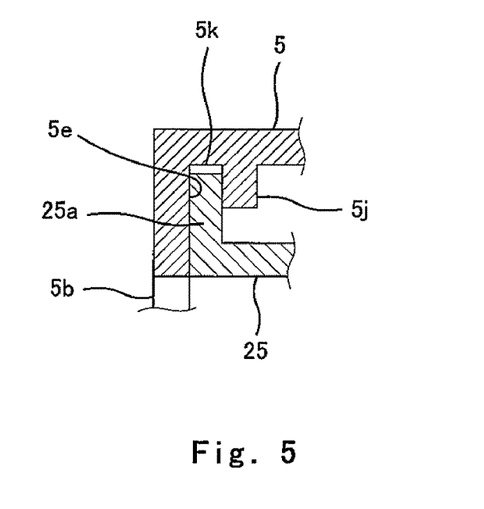
FIG. 5 is a cross-sectional view of a press rib of the hood.

FIG. 4 is a perspective view of the head lamp device 10L mounted to the hood 5. FIG. 5 is a cross-sectional view of a press rib 5n of the hood 5. As shown in FIG. 4, a bracket member 25c protruding from a front side portion which is a short side of the head lamp device 10L is fastened to the connecting member 16 by a bolt 26. Bracket members 25d and 25e protruding from a rear side portion which is a short side of the head lamp device 10L are fastened to bracket members 5p and 5q protruding from the inner surface 5e of the hood 5 by bolts 27 and 28, respectively.

As shown in FIGS. 4 and 5, the reflector unit 25 of the head lamp device 10L has a peripheral plate portion 25a which is joined to a portion of the inner surface 5e surrounding the opening 5b in the state where the head lamp device 10L is disposed within the opening 5b of the hood 5. The hood 5 has a press rib 5n protruding downward from a portion of the inner surface 5e which is located above the opening 5b. The press rib 5n forms an engaged recess 5k with a portion of the inner surface 5e surrounding the opening 5b. By inserting the peripheral plate portion 25a of the reflector unit 25 of the head lamp device 10L into the engaged recess 5k from below, the press rib 5n is brought into contact with the surface of the peripheral plate portion 25a at the space S (see FIG. 2) side, enabling the head lamp device 10L to be positioned.

Figure 6:
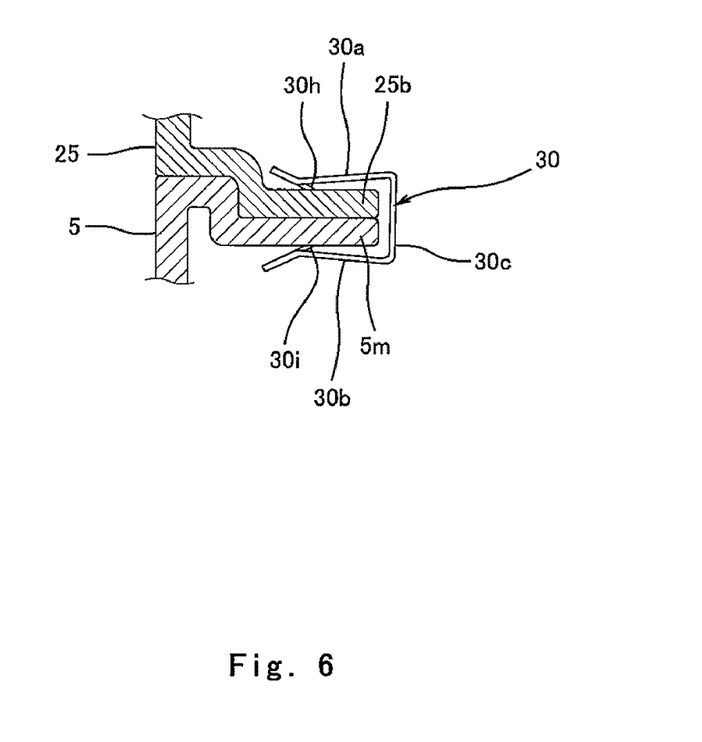
FIG. 6 is a partial cross-sectional view showing a state where the head lamp device is secured to the hood by a clip.
Figure 7:
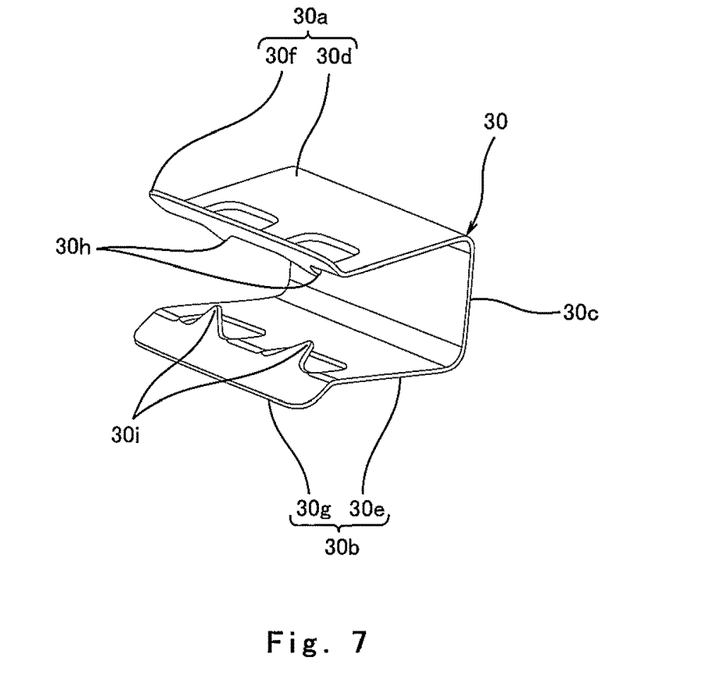
FIG. 7 is a perspective view of the clip.

FIG. 6 is a partial cross-sectional view showing a state where the hood 5 and the head lamp device 10L are retained by a clip 30. FIG. 7 is a perspective view of the clip 30. As shown in FIGS. 4 and 6, the hood 5 has a flange portion 5m protruding toward the space S (see FIG. 2) at the lower peripheral portion of the opening 5b. The flange portion 5m has a length which is more than a half of the length of the opening 5b in the forward and rearward direction. The reflector unit 25 of the head lamp device 10L has a flange portion 25b which is joined to the flange portion 5m of the hood 5 from above such that the flange portion 25b is in surface contact with the flange portion 5m, in the state where the head lamp device 10L is disposed in the opening 5b. The length of the flange portion 25*b* in the forward and rearward direction is substantially equal to the length of the flange portion 5*m* of the hood 5. The flange portion 5*m* of the hood 5 and the flange portion 25*b* of the reflector unit 25 of the head lamp device 10L are retained and fastened by plural clips 30.

As shown in FIG. 7, the clip 30 has a pair of retaining plate portions 30*a* and 30*b* which are opposite to each other and a back plate portion 30*c* connecting base ends of the retaining plate portions 30*a* and 30*b*. The clip 30 is formed by press-forming of a metal plate. The retaining plate portion 30*a* has a retaining portion 30*d* and a taper portion 30*f*, while the retaining plate portion 30*b* has a retaining portion 30*e* and a taper portion 30*g*. The retaining portions 30*d* and 30*e* are closer to each other in a direction toward a tip end of the clip 30. The taper portions 30*f* and 30*g* respectively extend from the retaining portions 30*d* and 30*e* toward the tip end of the clip 30 such that they are away from each other. A pair of wedge portions 30*h* are provided at a boundary between the retaining portion 30*d* and the taper portion 30*f* of the retaining plate portion 30*a* such that the wedge portions 30*h* protrude to be closer to the retaining plate portion 30*b* toward the back plate portion 30*c*. Likewise, a pair of wedge portions 30*i* are provided at a boundary between the retaining portion 30*e* and the taper portion 30*g* of the retaining plate portion 30*b* such that the wedge portions 30*i* protrude to be closer to the retaining plate portion 30*a* toward the back plate portion 30*c*.

The wedge portions 30*h* and 30*i* have a triangular shape such that their tip ends are pointed. The base end portions of the wedge portions 30*h* are located at a boundary between the retaining portion 30*d* and the taper portion 30*f*, while the base end portions of the wedge portions 30*i* are located at a boundary between the retaining portion 30*e* and the taper portion 30*g*. The wedge portions 30*h* and 30*i* have a tilting angle substantially equal to the tilting angle of the taper portions 30*f* and 30*g*. The wedge portions 30*h* and 30*i* are on substantially the same plane as the taper portions 30*f* and 30*g*. The retaining portions 30*d* and 30*e* have punched holes around the wedge portions 30*h* and 30*i*, respectively. The clip 30 is manufactured in such a manner that the retaining portions 30*d* and 30*e* are punched in required locations to form shapes which become the wedge portions 30*h* and 30*i*, the taper portions 30*f* and 30*g* are bent with respect to the retaining portions 30*d* and 30*e*, thereby allowing the wedge portions 30*h* and 30*i* to have a desired tilting angle with respect to the retaining portions 30*d* and 30*e*.

As shown in FIG. 4, the peripheral plate portion 25*a* of the reflector unit 25 of the head lamp device 10L is inserted into the engaged recess 5*k* so that the head lamp device 10L is positioned with respect to the hood 5, and the flange portions 5*m* and 25*b* joined to each other are retained by the plural clips 30. The flange portions 5*m* and 25*b* are smoothly inserted into the clips 30, because the taper portions 30*f* and 30*g* are provided at the tip end of each clip 30 and the wedge portions 30*h* and 30*i* extend toward the back plate portion 30*c*. After the flange portions 5*m* and 25*b* are retained by the clips 30, the wedge portions 30*h* and 30*i* are bitten into the surfaces of the flange portions 25*b* and 5*m*, respectively inhibiting the clip 30 from coming off. Further, since the wedge portion 30*h* protrudes from the boundary between the retaining portion 30*d* and the taper portion 30*f* and the wedge portion 30*i* protrudes from the boundary between the retaining portion 30*e* and the taper portion 30*g*, the wedge portions 30*h* and 30*i* are stiff and are able to be sufficiently bitten into the flange portions 25*b* and 5*m*, respectively.

In the manner described above, since the upper side portion and the lower side portion of the head lamp device 10L which are longitudinal sides thereof are mounted to the hood 5 using the engaged recess 5*k* and the clips 30, the number of assembly steps can be reduced. In addition, a gap between the resin-made hood 5 and the resin-made head lamp device 10L is invisible from outside.

In the manner described above, the pair of head lamp devices 10R and 10L, which are relatively heavy components, are mounted to the resin-made hood 5 at right and left sides. The elastic deformation of the hood 5, which would be caused by the weight of the head lamp devices 10R and 10L, is inhibited, because the intermediate portion 20*b* of the support bar 20 is fastened to the hood 5 and the right and left end portions 20*a* of the support bar 20 are fastened to the head lamp devices 10R and 10L, respectively. Therefore, the shape of the flexible hood 5 is maintained as designed. This makes it possible to avoid that the hood 5 is incompatible with the cover 7 in dimension, and hence to improve an external appearance of the utility vehicle 1.

Figure 8:
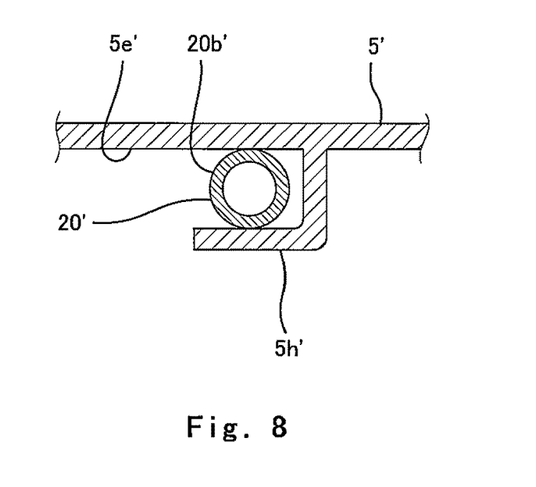
FIG. 8 is a partial cross-sectional view showing a state where the support bar engages with the hood.

It can be appreciated that the above embodiment having the support bar 20 fastened to the hood 5 by the rivets 22 is exemplary. FIG. 8 is a partial cross-sectional view showing a state where a support bar 20' is engaged with a hood 5' according to a modification. As shown in FIG. 8, in the modification, the hood 5' has an engaged portion 5*h'* on a portion of an inner surface 5*e'* between the openings 5*a* and 5*b*. The engaged portion 5*h'* is L-shaped as viewed from the axial direction of the support bar 20'. In the support bar 20', an intermediate portion 20*b'* serves as an engagement portion. By pressing the intermediate portion 20*b'* of the support bar 20' into the engaged portion 5*h'*, the support bar 20' is engaged with the hood 5'. Alternatively, the engaged portion 5*h'* may be provided with a mechanism for inhibiting disengagement of the support bar 20'.

It can be further appreciated that the above-described embodiments may be alternately configured and still be within the scope of this disclosure. For example, whereas in the above embodiment, the support bar 20 is fastened to the head lamp devices 10R and 10L, support bar 20 may be engaged with the head lamp devices 10R and 10L or may be configured to contact and support the lower surfaces of the head lamp devices 10R and 10L. Whereas in the above embodiment, the right and left end portions 20*a* of the support bar 20 terminate in locations under the light lamp devices 10R and 10L, respectively, the support bar 20 may be extended to outside the head lamp devices 10R and 10L in the vehicle width direction and portions of the right and left side surfaces of the hood 5 which are located outside the openings 5*a* and 5*b* in the vehicle width direction may be supported by the both end portions of the support bar 20. In this case, both end portions of the support bar 20 may be fastened to the hood 5 and the support bar 20 may be configured to contact and support the lower surfaces of the head lamp devices 10R and 10L. Or, the support bar 20 may be fastened to the head lamp devices 10R and 10L and both end portions of the support bar 20 may be configured to contact and support the right and left side surfaces of the hood 5 like a prop. Further, in some embodiments the non-light-emitting unit of each head lamp device 10R or 10L may be an accessory portion, a casing, etc., instead of the reflector unit 25.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
a hood which is flexible and is configured to cover a space between a pair of right and left front wheels from above;
a pair of head lamp devices which are mounted to the hood on a space side; and
a support member being a support bar extending in a rightward and leftward direction between the pair of head lamp devices;
wherein end portions of the support member are respectively fastened to the head lamp devices, and wherein the support member is configured to support the pair of head lamp devices and the hood.

2. The utility vehicle according to claim 1,
wherein the hood has a pair of openings at right and left sides thereof;
wherein the pair of head lamp devices are disposed in the pair of openings, respectively; and
wherein the support member has right and left end portions supporting the pair of head lamp devices, respectively, and a portion of the support member between the right and left end portions is mounted to the hood.

3. The utility vehicle according to claim 1,
wherein the support member includes a metal-made pipe.

4. The utility vehicle according to claim 1,
wherein each of the head lamp devices includes a light emitting unit and a non-light-emitting unit; and
wherein each of respective end portions of the support member is fastened to the light emitting unit.

5. The utility vehicle according to claim 1,
wherein the hood has a flange portion protruding toward the space at a peripheral portion of an opening;
wherein each of the head lamp devices has a flange portion which is joined to the flange portion of the hood in a state where the head lamp device is disposed in the opening; and
wherein the flange portion of the hood and the flange portion of the head lamp device are retained and fastened by a clip.

6. The utility vehicle according to claim 5,
wherein the clip has a pair of retaining plate portions which are opposite to each other and a back plate portion connecting base end portions of the pair of retaining plate portions;
wherein the pair of retaining plate portions respectively have a pair of retaining portions which are closer to each other toward a tip end of the clip and taper portions respectively extending from the retaining portions so as to be away from each other toward the tip end; and
wherein the clip has wedge portions each of which is provided at a boundary between the retaining portion and the taper portion, the wedge portions protruding in a direction in which the retaining plate portions are opposite to each other and toward the back plate portion.

7. The utility vehicle according to claim 1,
wherein each of the head lamp devices has a peripheral plate portion which is joined to a surface of a portion of the hood which is located on the space side and surrounds an opening in a state where the head lamp device is disposed in the opening; and
wherein the hood has a press rib which is configured to contact a surface of the peripheral plate portion on the space side.

8. A utility vehicle comprising:
a hood which is flexible and is configured to cover a space between a pair of right and left front wheels from above;
a pair of head lamp devices which are mounted to the hood on a space side; and
a support member provided to extend between the pair of head lamp devices;
wherein the support member is configured to support the pair of head lamp devices and the hood;
wherein the hood has a pair of openings at right and left sides thereof;
wherein the pair of head lamp devices are disposed in the pair of openings, respectively;
wherein the support member has right and left end portions supporting the pair of head lamp devices, respectively, and a portion of the support member between the right and left end portions is mounted to the hood;
wherein the hood has a fastened portion provided on a surface thereof on the space side between the pair of openings;
wherein the support member has a fastened portion provided between the right and left end portions; and
wherein the fastened portion of the hood and the fastened portion of the support member are fastened to each other by a fastener member.

9. The utility vehicle according to claim 8,
wherein the fastened portion of the hood is a mounting plate portion having a mounting hole and the fastened portion of the support member is a mounting plate portion having a mounting hole;
wherein the fastener member is a rivet; and
wherein the rivet is inserted into the mounting holes of the mounting plate portion of the hood and the mounting plate portion of the support member in a state where the mounting plate portions of the hood and the support member are joined to each other and the mounting holes conform to each other.

10. A utility vehicle comprising:
a hood which is flexible and is configured to cover a space between a pair of right and left front wheels from above;
a pair of head lamp devices which are mounted to the hood on a space side; and
a support member provided to extend between the pair of head lamp devices;
wherein the support member is configured to support the pair of head lamp devices and the hood;
wherein the hood has a pair of openings at right and left sides thereof;
wherein the pair of head lamp devices are disposed in the pair of openings, respectively;
wherein the support member has right and left end portions supporting the pair of head lamp devices, respectively, and a portion of the support member between the right and left end portions is mounted to the hood;
wherein the hood has an engaged portion on a surface thereof on the space side between the pair of openings;
wherein the support member has an engagement portion between the right and left end portions; and
wherein the engagement portion of the support member is engaged with the engaged portion of the hood.

* * * * *